United States Patent
Yaman et al.

(10) Patent No.: US 12,516,981 B2
(45) Date of Patent: Jan. 6, 2026

(54) FIBER SENSING BY MONITORING POLARIZATION FUNCTION OF LIGHT ON SUPERVISORY PATH OF CABLES

(71) Applicant: NEC Laboratories America, Inc., Princeton, NJ (US)

(72) Inventors: Fatih Yaman, Princeton, NJ (US); Shaobo Han, Princeton, NJ (US); Eduardo Fabian Mateo Rodriguez, Tokyo (JP); Yang Li, Atlanta, GA (US); Yoshihisa Inada, Tokyo (JP); Takanori Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 305 days.

(21) Appl. No.: 18/369,041

(22) Filed: Sep. 15, 2023

(65) Prior Publication Data
US 2024/0103215 A1 Mar. 28, 2024

Related U.S. Application Data

(60) Provisional application No. 63/414,642, filed on Oct. 10, 2022, provisional application No. 63/407,496, filed on Sep. 16, 2022.

(51) Int. Cl.
*G01J 4/00* (2006.01)
(52) U.S. Cl.
CPC .................................. *G01J 4/00* (2013.01)

(58) Field of Classification Search
CPC .......... G01V 1/01; G01V 1/226; G01V 1/307; G02B 6/024; G02B 6/4427; G01J 4/00
See application file for complete search history.

(56) References Cited

U.S. PATENT DOCUMENTS

| | | | |
|---|---|---|---|
| 11,385,365 B2 * | 7/2022 | Kamalov | G01V 1/282 |
| 12,332,394 B2 * | 6/2025 | Yaman | G01V 1/226 |

* cited by examiner

*Primary Examiner* — Kevin K Pyo
(74) *Attorney, Agent, or Firm* — Vincent Duffy; Joseph Kolodka

(57) ABSTRACT

An advance in the art is made according to aspects of the present disclosure directed to methods for earthquake sensing that employ a supervisory system of undersea fiber optic cables. Earthquakes and other environmental disturbances are detected by monitoring the polarization of interrogation light instead of its phase. More specifically, our methods monitor the transfer matrix rather than just polarization and isolate disturbance location by monitoring eigenvalues of the polarization transfer matrix. From results obtained we have demonstrated experimentally that we can monitor disturbances that affect signal polarization on a span-by-span basis using High Loss Loop Back (HLLB) paths. It is shown that by measuring the polarization rotation matrix and determining the polarization rotation angle we can identify the span where the disturbance occurred with 35 dB extinction with no limitation on the magnitude of the disturbance and the number of affected spans.

6 Claims, 12 Drawing Sheets

FIBER SENSING BY MONITORING POLARIZATION FUNCTION OF LIGHT ON SUPERVISORY PATH OF CABLES

CROSS-REFERENCE TO RELATED APPLICATIONS

This application claims the benefit of U.S. Provisional Patent Application Ser. No. 63/407,496 filed Sep. 16, 2022, and United States Provisional Patent Application Ser. No. 63/414,642 filed Oct. 10, 2022, the entire contents of each which is incorporated by reference as if set forth at length herein.

FIELD OF THE INVENTION

This application relates generally to sensing environmental disturbances using optical fibers. More particularly, it pertains to improved sensing methods for undersea optical fiber communications systems.

BACKGROUND OF THE INVENTION

As is known in the art, fiber optic communications systems in which optical signals are transmitted over optical fibers have become essential elements of contemporary life as they are very good at transmitting high bandwidth optical signals without causing large distortions or attenuation to the signals. At the same time optical fibers are sensitive to disturbance impacted on them as such disturbances on an optical fiber causes a change in the phase and polarization of light traversing the fiber.

In undersea optical communications systems, optical cables that encloses the optical fibers lay on an ocean bottom and in some locations they may be buried. The ocean bottom is usually very quiet, and there are not many disturbances such as noise from human activity. Notwithstanding, natural disturbances such as earthquakes, subsea landslides, volcanic activity, etc., does occur and as a result light traversing the undersea optical fiber undergoes phase and polarization modification at a disturbance location. By monitoring the phase and polarization of the light traversing an undersea optical fiber, information regarding an environmental disturbance can be obtained. Even subtle disturbances from other sources including weather, tsunamis, ocean swells, tides, ocean currents, human activity, cable strumming, etc., can be detected the same way. One problem with such detection, however, is the precise determination of the location, magnitude, and characteristics of such disturbances.

SUMMARY OF THE INVENTION

An advance in the art is made according to aspects of the present disclosure directed to methods for earthquake sensing that employ a supervisory system of undersea fiber optic cables.

In sharp contrast to the prior art our inventive method detects undersea environmental events including earthquakes by monitoring the polarization of interrogation light instead of its phase. More specifically, methods according to the present disclosure monitor the transfer matrix rather than just polarization and isolate disturbance location by monitoring eigenvalues of the polarization transfer matrix.

Viewed from an operational perspective, our inventive utilizes existing supervisory facilities of deployed undersea fiber optic cables for earthquake sensing by configuring the supervisory facilities to return portions of interrogation optical signals back to their origin periodically from repeater locations distributed along the length of the undersea fiber optic cable. Such operation not only provides an indication of the existence of environmental disturbances, but also provides precise location information as to where along the length of the undersea fiber optic cable the environmental disturbance occurred.

From results obtained we have demonstrated experimentally that we can monitor disturbances that affect signal polarization on a span-by-span basis using High Loss Loop Back (HLLB) paths. It is shown that by measuring the polarization rotation matrix and determining the polarization rotation angle we can identify the span where the disturbance occurred with 35 dB extinction with no limitation on the magnitude of the disturbance and the number of affected spans.

BRIEF DESCRIPTION OF THE DRAWING

A more complete understanding of the present disclosure may be realized by reference to the accompanying drawing in which.

DETAILED DESCRIPTION OF THE INVENTION

Figure 1:
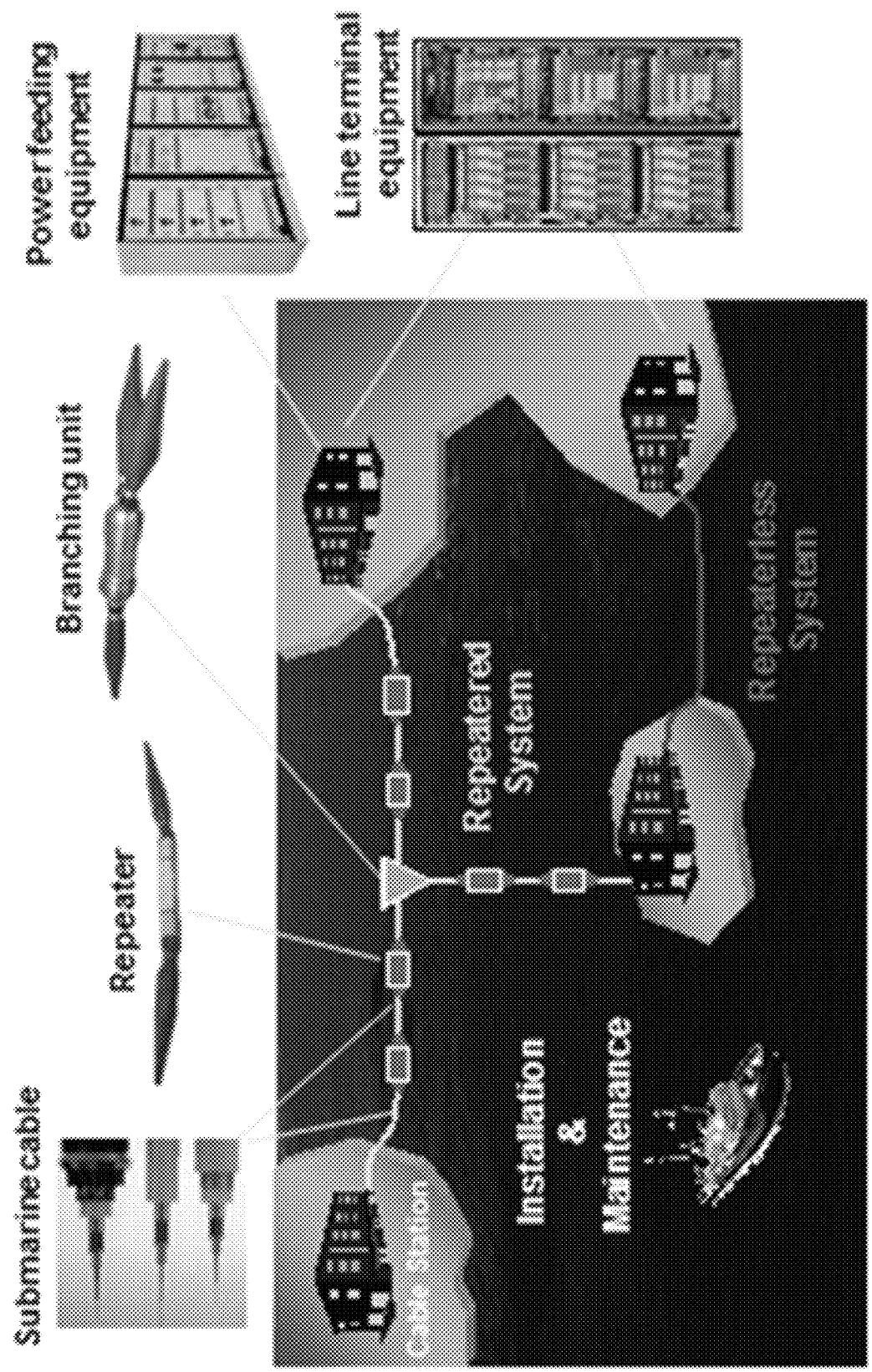
FIG. 1 is a schematic diagram showing an illustrative undersea fiber-optic communications arrangement.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that undersea fiber optic communications cables are the true backbone of communications in the world. Nearly all data that travels between continents has to be delivered through undersea fiber optic cables.

There are several facets of an undersea (submarine) transmission that sets it apart from other fiber communication systems. First, they are very long, as they typically connects different continents. Second, they are very expensive since it us expensive to deploy cables on the seabed floor. Additionally, once an undersea fiber optic cable is deployed, it is extremely expensive to replace, upgrade, or repair. Therefore, even small degradations caused by optical fiber impairments cumulatively add and reduce available transmission capacity. Since undersea fiber optic cable and systems are so expensive to deploy and difficult to maintain/upgrade, it is—of course—extremely important to correctly characterize any limitations to capacity both simply and accurately.

Yet another difference between undersea fiber optic communications cables and more common deployments is that most undersea systems have a so called "supervisory system" built into them. Such a supervisory system is typically an optics-based system that is used to monitor the health and operation of the undersea fiber optic cable. Since an undersea fiber optic cable becomes inaccessible without damaging it once it is deployed on the ocean bottom, it is therefore important to monitor the health of the undersea fiber optic cable from its two landing ends located on land. This monitoring is achieved by the supervisory system and as we shall show and describe, it is employed in methods and systems and methods according to the present disclosure to provide undersea earthquake sensing.

Even though there are other ways of sensing earthquakes and other seismic activity, using undersea cables for earthquake sensing is attractive for a number of reasons. First, undersea fiber optic communications system are already deployed, and they can be used for sensing without sacrificing their main purpose of carrying communications traffic. Second, they extend between continents, and can simultaneously monitor many parts of the world—most of which are very difficult to access/monitor otherwise. Third, being fiber optic communication cables, they already include communications infrastructure necessary for quickly relaying earthquake, tsunami, or other undersea environmental data.

FIG. 1 is a schematic diagram showing an illustrative undersea fiber-optic communications arrangement. With reference to that figure, it may be noted that data to be transmitted originates in one of the Cable stations. It is delivered to the other cable stations across the sea through an undersea (submarine) fiber optic cable. As those skilled in the art will understand and appreciate, undersea fiber optic cable have two primary parts, namely the fiber optic cable span, and repeaters.

In an illustrative fiber optic cable span, the length of the fiber optic cable can be 40 km to 150 km or longer, but typically the length is in the 50-80 km range. An illustrative undersea fiber optic cable span includes several elements as shown on the top left of FIG. 1. However, the one part of the undersea fiber optic cable span that is of utmost concern for our purposes is the optical fiber itself.

As is known, optical fibers are very thin—about 250 microns diameter—strands of glass that guide light with low attenuation. Optical fibers are typically constructed from pure silica glass and exhibit a cylindrical shape. Light is guided in an optical fiber in a doped central region (core) that is surrounded by glass exhibiting a different index of refraction (cladding). In a typical glass optical fiber, the core diameter is on the order of 5-12 micrometers, and the cladding diameter is about 125 micrometers. The outermost glass is coated by polymeric materials that protect it and result in an overall diameter of core+cladding+coating to be approximately 250 micrometers.

Contemporary undersea fiber optic cables include many individual optical fiber. Since each optical fiber can carry additional data, the data carrying capacity of an individual undersea fiber optic cable having many individual optical fibers is therefore proportional to the number of individual optical fibers contained in the cable.

Since individual optical fibers are very thin, the capacity of an undersea fiber optic cable having many individual optical fibers can be increased dramatically by adding more individual optical fibers. However, this is not always the case because of the power limitation.

As is known, optical fibers exhibit low attenuation. However, with such attenuation, optical power output from an optical fiber can drop to 1% after only 1 span. As a result, even after only one span, signal light introduced into an undersea optical fiber needs to be amplified.

Amplification is done by active components called amplifiers. Amplifiers add unavoidable noise during amplification. A dominant noise added by the amplifiers is amplified spontaneous emission (ASE) noise. In an undersea deployment, amplifiers are housed in the second part of an undersea installation called repeaters. Within the repeaters there are typically one amplifier dedicated to each individual optical fiber in the undersea cable. As such, one limitation on the number of optical fibers that can be supported by an undersea fiber optic cable and system is the number of amplifiers that can be physically fit into a repeater. Another limitation on the number of optical fibers that can be supported by an undersea fiber optic cable and system is the limited electrical power to operate the amplifiers/repeaters. Since each amplifier requires electrical power to amplify optical signal power, and electrical power sources do not generally exist in vast undersea locations, the electrical power must therefore be supplied from each landing end of the cable system which can be several thousand km long.

To better explain the problems encountered in undersea optical fiber communications systems we note that there are two technologies that are known and may be employed for earthquake sensing. One involves a forwarding technique while another involves a back-scattering technique.

The forwarding technique provides a very long very long sensing range/distance and can sense over the length of an optical fiber cable that is thousands of km long. However, even if an environmental disturbance is detected, there is no information available about where such disturbance occurs.

In sharp contrast, the scattering technique exhibits very good resolution. It can pinpoint the location of a disturbance to within centimeters along the length of an optical fiber cable. Unfortunately, however, the sensing range of the scattering technique is quite limited—typically limited to a single undersea fiber optic cable span.

During operation, the forwarding technique can rely on either sensing the phase modulation or polarization modulation induced by the disturbance. Typically, an expensive and highly stable low linewidth laser pulse is sent from one end of the fiber optic cable, and the modulation is monitored on the other end. The light is always moving in the forward direction. In some cases, the light is looped back at the end station to go back to the origin, nevertheless, the light is always moving forward. As a result, at the end of the link the measured modulation is the accumulation of all the modulations induced by all the disturbances along the link. Therefore, the location of the disturbance cannot be retrieved.

The scattering technique relies on a part of a light signal being continuously scattered back to the origin continuously along the length of the optical fiber. Optical fibers, though being quite close to perfect, still have imperfection along their length. In particular glass density fluctuations cause a small fraction of light to be scattered in all directions. Part of this scattering in the backward direction is captured by the fiber, and travels backwards with respect to the direction of the original light (Rayleigh back scattering). This scattering can be used to sense the disturbance, but more importantly it can pinpoint where the disturbance is occurring. The systems using this scattering for sensing are known in the art as distributed fiber optic sensing (DFOS) or distributed acoustic sensing (DAS) or distributed vibration sensing (DVS) systems. For our purposes herein, we call them DAS.

As is known however, Rayleigh back scattering is very small—in the range of −40 dB per kilometer of optical fiber at a typical communications wavelength band around 1550 nm. The small power exhibited by the Rayleigh scattering is buried in ASE noise generated by the operation of amplifiers in the repeaters. As a result, DAS systems can only provide a signal-to-noise ratio capable of meaningfully sensing earthquakes over short distances.

To be more specific, in undersea fiber optic transmission systems, the repeaters guide light only in one direction, and block the light traveling in the opposite direction as required for proper operation of amplifiers with isolators. Typically, there are small couplers that bypass these isolators to guide the reflected light into the returning fiber with high losses called loop-back couplers. When the small reflection efficiency of Rayleigh scattering and the high coupling losses of the loop-back couplers, the scattered power returning to the source of the optical interrogation signals would be too small. This essentially limits the range of the DAS to a single span, and in some cases to a few spans at most.

We note that, in most undersea fiber optic cables, the loop-back couplers have at least two purposes. One is to couple light reflected by Rayleigh scattering and inject it into an optical fiber carrying traffic in the opposite direction. The other purpose is to create a path for a supervisory signal.

Supervisory signals are typically separate from the communication channels. These signals are typically pulses at a predesignated wavelength. As supervisory signals travel along the optical fiber together with a communications traffic signal, at every repeater a small part of this supervisory signal is diverted back towards the origin by combining them into an optical fiber carrying the communications traffic towards the origin. As such, the path taken by the supervisory signal is called the supervisory path which the loop-back couplers is a part of.

Previously, we have evaluated using a supervisory path for sensing, but by monitoring the phase of the returning signal. This supervisory path phase monitoring approach overcame the problem of low power returning because the loop-back path returns a large enough portion of the sensing signal if its wavelength is tuned in the range of the supervisory signal. With this method, a sensing signal with high enough signal-to noise ratio can be achieved over transpacific distances and at the same time a resolution of span length can be achieved. However, this method requires very stable lasers with low laser linewidths which is required to insure that any injected laser light phase does not change significantly in the absence of an environmental disturbance impacting the optical fiber. This is especially challenging in a low frequency region where laser phase noise stabilization becomes very difficult, as it is the region of interest for many seismic sensing applications, i.e., milli-Hz to tens of Hz band.

Yet another problem encountered when employing phase sensing in general is that, phase is very sensitive to disturbances. When the disturbances are large, sensing equipment and techniques can be overwhelming.

As we shall show and describe, our inventive method and systems monitor polarization instead of phase, while still using a supervisory path. To be more specific, we monitor not only polarization, but polarization transfer function of the fiber. As such, when polarization is monitored instead of phase, laser phase noise is not an issue, and cheaper/smaller lasers may be employed.

However, interchanging phase with polarization is quite difficult in practice. One reason is that phase is a scalar quantity, and when phase accumulates from one span to another, phase from the one span to the other is added. Addition of scalar quantities is a commutative operation, which allows for cancellation of accumulated phase up to the monitored span and isolate the disturbances that happened only in that span. In contrast, polarization is a vector, and the polarization transfer function is a matrix. The polarization transfer matrix accumulates from one span to the other through matrix multiplication which is not commutative. Therefore, a naïve approach to canceling accumulated transfer matrix up to a certain span would fail. As we now disclose, we advantageously overcome this problem by monitoring eigenvalues of the polarization transfer matrix. We show that eigenvalues of the polarization transfer matrix remains unchanged even after multiplication of transfer matrix of multiple spans due to the principle of matrix similarity as we describe further.

Operationally, our inventive method and systems according to the present disclosure make use of existing supervisory capabilities of undersea fiber optic cables for earthquake sensing. The supervisory system of the undersea fiber optic cable returns parts of an optical signal back to the origin periodically at every repeater location. This solves two problems at once. First we would know from where the returning signal is returning from, which provides a resolution of span length that is sufficient for wide area disturbances such as earthquakes. Second, the returned signal is strong enough that the signal-to-noise ratio of the received signal is not limited by ASE noise of the amplifiers. The returned signal is much larger as compared to typical DAS because the return signal is effected by a coupler, or a reflector or a circulator—each having a much larger coupling ratio as compared to Rayleigh back scattering.

In addition to the nature and generation of return signals, our method and systems according to the present disclosure advantageously monitor the polarization transfer matrix rather than polarization only. As a result, we can isolate where a disturbance occurred by monitoring the eigenvalues of the polarization transfer matrix.

As noted previously, particularly advantage features of our inventive systems and methods according to the present disclosure include: use of existing undersea fiber optic cable architecture, therefore does not incur additional costs; signals do not rely on weak scattering, but robust rerouting of signal and sends back signal portion to the origin periodically along the cable length—similar to a DAS—therefore it provides location information; monitoring of full polarization rotation matrix rather than polarization only, or phase only; allows use of cheaper, more practical lasers that may have large laser phase noise; and non-commutativity of matrix operations are circumvented by monitoring the eigenvalues which remains unchanged due to matrix similarity condition being satisfied, thereby providing disturbance localization.

Figure 2:
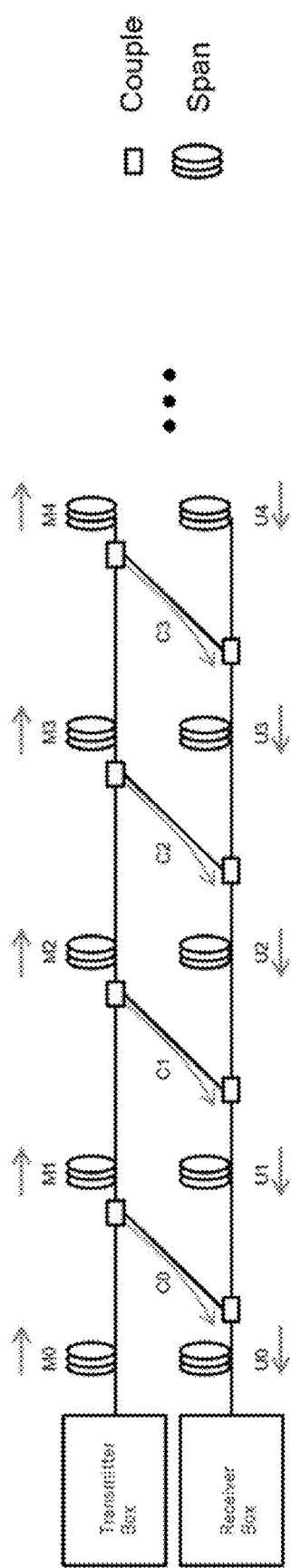
FIG. 2. is a schematic diagram showing an illustrative polarization sensing system according to aspects of the present disclosure.

FIG. 2. is a schematic diagram showing an illustrative polarization sensing system according to aspects of the present disclosure. As illustratively shown in this figure, an interrogation pulse travels down the optical fiber link. After each span, a portion of the signal is split/separated, and the split portion is combined with the return link, while the rest continues on. $M_k(t)$, $U_k(t)$, $C_k(t)$ are 3×3 real, unitary matrices, i.e., $M_k(t)M_k^T(t)=I$, representing the transfer matrix of spans. Spans can be assumed to be 60~90 km long. Connections $C_k$ are very short, meters. $M_k(t)$, $U_k(t)$, can have fast time dependence caused by disturbance. As will be appreciated, the total distance could be 10000 km or more. The total number of spans can be more than 100.

Measure the Polarization Transfer Matrix from Polarization Measurements

Figure 3:
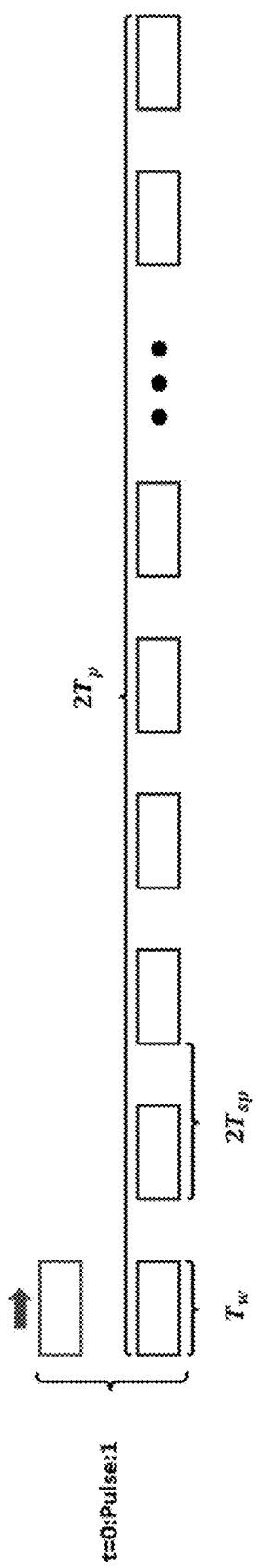
FIG. 3 is a schematic diagram showing an illustrative result when an optical pulse with a width of Tw is launched into a supervisory path of an undersea optical cable wherein right arrows indicate pulses injected into cable and left arrows indicate returning pulses after each consecutive span, according to aspects of the present disclosure.

FIG. 3 is a schematic diagram showing an illustrative result when an optical pulse with a width of Tw is launched into a supervisory path of an undersea optical cable wherein right arrows indicate pulses injected into cable and left arrows indicate returning pulses after each consecutive span, according to aspects of the present disclosure.

To measure the transfer matrices of the path taken by the light, pulses of width $T_W$ are launched into the supervisory path of the cable. Launching into the supervisory path means sensing light at a designated frequency. At this designated frequency, part of the light is coupled back into the return path after each span. Note that the pulse width of the light should be shorter or equal to the time of flight for the light to travel one span up and one span down, i.e., $T_W \leq 2T_{SP}$. Here $T_{SP}$ is the time of flight over a single span. In this fashion, a train of pulses return to the receiver. Each consecutive pulse would travel one additional pair of span (out and back). From the arrival time of the returned pulses, we can determine which pulse is returning from which path, and because of the condition $T_W \leq 2T_{SP}$ they do not mix.

When light travels through a fiber span, the light undergoes a rotation of its state of polarization (SOP). As those skilled in the art will understand, SOP of light can be described as a 1×3 real vector, sometimes referred to as the Stokes vector, and for the purposes of this disclosure it can be assumed to be a unitary vector. The output SOP depends on the input SOP, and also the state of the fiber span. The state of the fiber span is sensitive to external disturbances and changes according to the nature of the disturbances.

The transfer function of a fiber span can be described as a 3×3 real matrix, in the Stokes space, and for the purposes of this IR, can be well approximated as a unitary matrix. In such formulation, Stokes vector of the output light can be described as $$A = Ma$$

Where A is the output Stokes vector, a is the input Stokes vector, and M is the transfer matrix of the fiber span. It can be seen that even if a is constant and M is time dependent—due to disturbances—output polarization will be time varying.

We note that this effect has been used to detect whether an earthquake or other environmental disturbance occurred near any part of an undersea fiber optic cable. As described operationally, light having constant SOP is transmitted at a proximal end of an undersea cable and the SOP is monitored at the other, distal end. As we have noted, by monitoring for changes in the SOP at the distal end, the presence of an earthquake or other seismic disturbances can be deduced. However, as we have also noted, the location along the length of the undersea optical fiber cable where the earthquake occurred cannot be determined by these systems.

Systems and methods according to the present disclosure advantageously cure this defect by monitoring the output SOP A and estimating the transfer matrix M which contains even more information.

Looking at FIG. 3, one can observe that the SOP of the light returning from each span would be different, as they travel through different paths. The light traveling each individual light path would include information about the state of the transfer matrix of the path traveled. Each consecutive light pulse would have additional information about the extra span traveled as compared to a previous one.

However, it is not easy to separate the disturbance added just by the last additional span traveled. To separate out this information—according to aspects of the present disclosure—we monitor the transfer matrix rather than the output SOP. Unfortunately, however, the transfer matrix cannot be obtained by only a single measurement of one input SOP and its corresponding output SOP. It is necessary to make multiple measurements each with an SOP independent from the others. The number of SOPs required to measure depends on the implementation constraints, but generally, at least two are required however, the more the better. There are different algorithms to achieve this, and a Kabsch method is one example.

Therefore, our inventive method sends two or more pulses each with an independent SOP vector. Based on the input SOPs and the received corresponding output SOPs, we estimate the transfer matrix. This can be implemented in the time-domain, in the frequency-domain, or a combination of the two domains. In the following paragraphs we describe how to estimate the transfer matrix of the path traveled.

Figure 4:
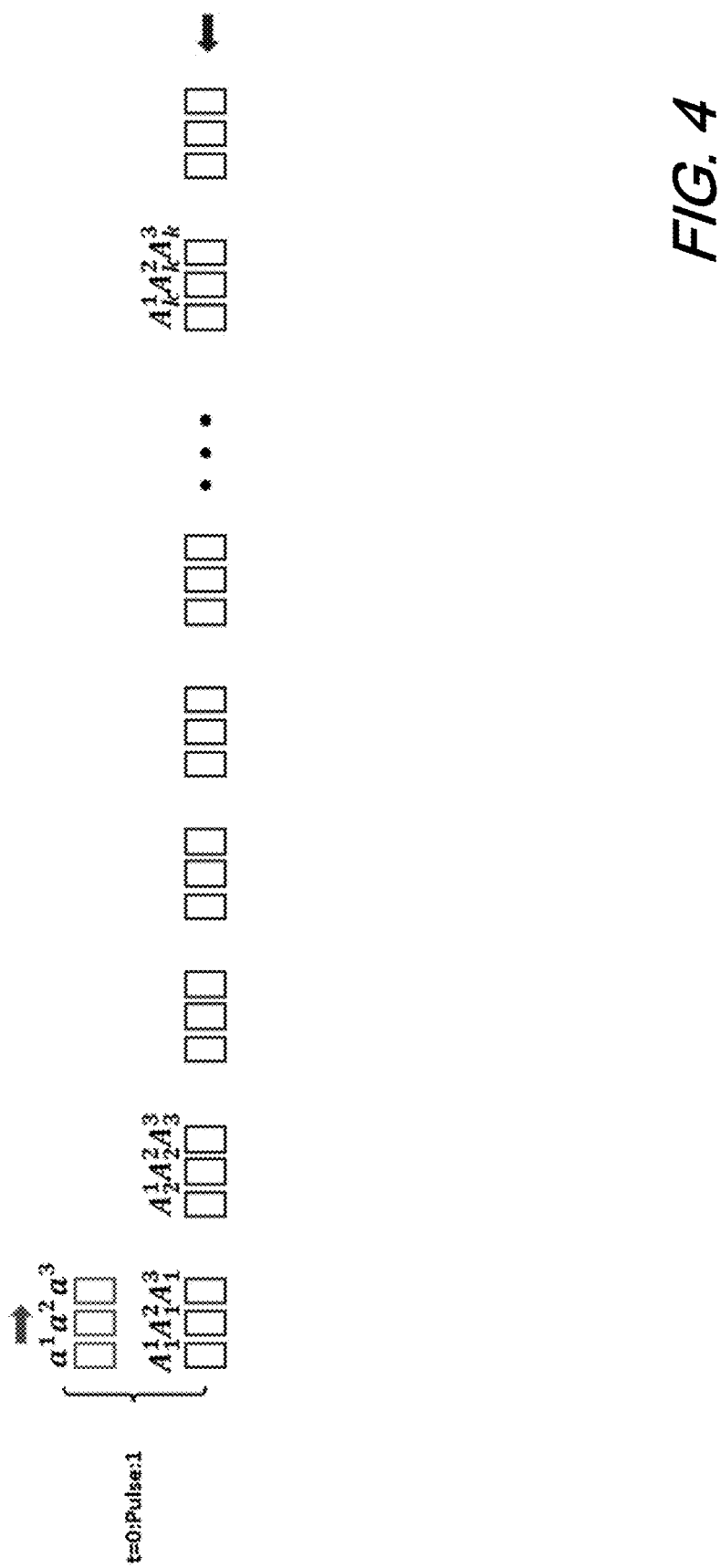
FIG. 4 is a schematic diagram showing an illustrative time domain implementation of measuring transfer matrix of different paths traveled by sending pulses with known SQPs and measuring corresponding output SOPs. From the known inputs and outputs, corresponding transfer matrix is determined. Right arrows indicate pulses entering optical cable, left arrows indicate pulses returning from optical cable according to aspects of the present disclosure.

FIG. 4 is a schematic diagram showing an illustrative time domain implementation of measuring transfer matrix of different paths traveled by sending pulses with known SQPs and measuring corresponding output SOPs. From the known inputs and outputs, corresponding transfer matrix is determined. Right arrows indicate pulses entering optical cable, left arrows indicate pulses returning from optical cable according to aspects of the present disclosure.

With reference now to FIG. 4, there it schematically shows a time domain implementation of transfer matrix determination. The input pulse is divided into three sections, each with SOP vectors that are mutually independent. In practice, the number of sections can be more than 3.

In this example, the duration of the three pulses in total is less than $2T_{SP}$ as defined above. Also in this example, each of the sub-pulses have the same frequency, but they can be of different frequencies as well. For each triplet that is introduced into the fiber, we receive a corresponding triplet from different paths traveled. Similar to the case in the figure, we can determine paths traveled by these triplets from their arrival time. By using algorithms such as Kabsch algorithm, using the known input SOPs, and corresponding output SOPs we can determine the transfer matrix of each traveled path.

In pure time-domain implementation, we can tell apart $A_k^1$, $A_k^2$, $A_k^3$, and tell them that they correspond to return pulses from the kth span with inputs $a^1$, $a^1$, $a^3$ because they are ordered, and don't overlap in time. In a frequency domain implementation, $a^1$, $a^1$, $a^3$ may have mutually exclusive frequency content, they may or may not overlap in time, and their corresponding outputs can be determined based on their frequency.

It is also assumed that the input pulses are launched frequently enough that it is faster than the fastest changes that is expected to occur in the cable due to external disturbances. As a result, the triplets in the above examples would be launched in such a quick succession that between them the transfer matrix of the link remains approximately constant.

At this point we note the following.

Input $a^i$ is 1×3 real vector of unit length. It is fully controllable.

In terms of time scales. Assuming 60 km spans, time of flight for pulse to cross a single span is 0.3 ms.

The default is that once we send at, we wait for the last pulse to return before sending the next one. That is our interrogation speed. It is also known as sampling speed. For 10000 km, this is roughly 10 Hz. Notwithstanding, there exist methods to increase it 100 fold, even 1000 fold with increasing difficulty. Typical disturbances expected due to seismic activity have vibrations in the 0.2-10 Hz range.

Output $A_k^i(t)$ is time dependent due to time dependence of the matrices.

The overall polarization transfer function from transmitter to receiver for a pulse returning from the kth amplifier is $T_k$.

$T_k$ can be represented in the form $T_k = M_0 M_1 \ldots M_k C_k U_k \ldots U_1 U_0$, where $M_k$ is the rotation matrix, or the polarization transfer matrix corresponding to the kth span in the forward direction, $U_k$ is the rotation matrix corresponding to the kth span in the backward direction, $C_k$ is the rotation matrix for the short path that connects the forward path to the backward path at the kth span.

By sending two different $S_0$ in rapid succession, and comparing the received pulses, we can determine $T_k$.

In terms of the magnitude we expect the disturbance rotates the polarization but in the range of a radians or so.

Given a set of paired input and noisy outputs, the optimal rotation matrice rom $T_k$ minimizing the root mean squared deviation can be calculated by using the Kabsch algorithm.

Isolating the Contributions of Different Spans Via Eigenvalue Sensing.

Multiple disturbances might occur simultaneously in different spans. As such, it is necessary to separate signatures of these multiple disturbances and where they are happening, at what magnitude, and, at what frequencies.

The mathematical model of the sensing system can be written as follows:

$$T_0 = M_0 C_0 U_0$$
$$T_1 = M_0 M_1 C_1 U_1 U_0$$
$$\ldots$$
$$T_k = M_0 \ldots M_k C_k U_k \ldots U_0,$$

In addition, part of the first and last spans of an overall undersea fiber optic link are connected to landing stations. The rest are underwater. In the absence of disturbances, the majority of the background vibration noise is expected to originate from the parts that are in the landing stations, because landing stations are very noisy environments. In fact, it is possible that this noise may be larger than a disturbance signature. Therefore, it is crucial to isolate the mixed contributions of different spans from $T_k$.

To achieve this, a chain graph structure is utilized, and we inventively employ the following re-formulation.

If we define $H_k = M_0 M_1 \ldots M_k$, $J_k = U_k \ldots U_1 U_0$, we have:

$$Q_{k+1} = M_{k+1} C_{k+1} U_{k+1}.$$

Then, $T_k$ and $T_{k+1}$ can be written equivalently as, $$T_k = H_k C_k J_k$$

$$T_{k+1} = H_k Q_{k+1} J_k$$

By left multiplying $T_{k+1}$ by the inverse of $T_k$, we can get:

$$T_k^{-1} T_{k+1} = J_k^{-1} (C_k^{-1} Q_{k+1}) J_k$$

Although $C_k^{-1} Q_{k+1}$ is unknown, $T_k^{-1} T_{k+1}$ can be directly computed from measurements. Moreover, $C_k^{-1} Q_{k+1}$ and $T_k^{-1} T_{k+1}$ are similar matrices sharing the same eigenvalues (as long as $J_k$ is invertible). Therefore, we can sense the eigenvalue of $C_k^{-1} Q_{k+1}$ from $T_k^{-1} T_{k+1}$ without the need of knowing $J_k$!

Note that the contributions of fast time dependence caused by disturbance from previous spans 1 to k has been subsumed into $H_k$, and connections $C_k$ are very short. Regardless of earthquake disturbance, changes in $C_k(t)$ is slow. Thus, changes in eigenvalues of $C_k^{-1} Q_{k+1}$ manifests changes in span k and k+1, and most part from the span k+1.

Since the contributions from different spans are decoupled, even if multiple earthquakes are happening simultaneously at different locations, we can still localize them separately. Meanwhile, noisy landing stations would not cause false alarm at other spans.

Note that $T_k^{-1}T_{k+1}$ has three eigenvalues, 1, $\cos(\theta_k) \pm i \sin(\theta_k)$, the sum of which equals its trace trace($T_k^{-1}T_{k+1}$)=2 $\cos(\theta_k)$+1. Accordingly, the $\theta_k$ can be easily computed using inverse trigonometric functions. The computation is fast and can be implemented on low-cost hardware.

The change point detection on multivariate time series has been reduced into multiple univariate time series and off-the-shelf methods applied.

To validate the method, we conducted simulation experiments under (1) noiseless setting, and (2) noise setting. The setup and results are as follows.

Noiseless setting. We simulated rotation matrices $M_k(t)$, $U_k(t)$, $C_k(t)$ in 10 spans and 400 time steps. At span 3, 7, and 8, we simulated earthquakes with fast changing sinusoidal pulses. For the rest of spans, we simulated data by slow changing sinusoidal functions, where the phases and frequencies are randomly picked. When the simulated data is plotted, the decoupled eigenvalue for each span clearly shows the earthquake disturbances at the expected spans.

Noise setting. Building upon the noiseless setting. we generated noisy observations T' by solving the formula Y=Tx; Y+n=T'x, where T is noiseless observation, x is a randomly generated 3×N matrix, and n is a Gaussian noise with zero mean. In our experiments, the signal-to-noise-ratio (SNR) can be tuned by setting different variances of the Gaussian noise. From the results of our experiments, the earthquake pattern is clear when SNR is 10 dB. When SNR is 1 dB, a generated curve is much noisier, but we can still see that the earthquake pulses make a greater disturbance of rotation angle.

Figure 5:
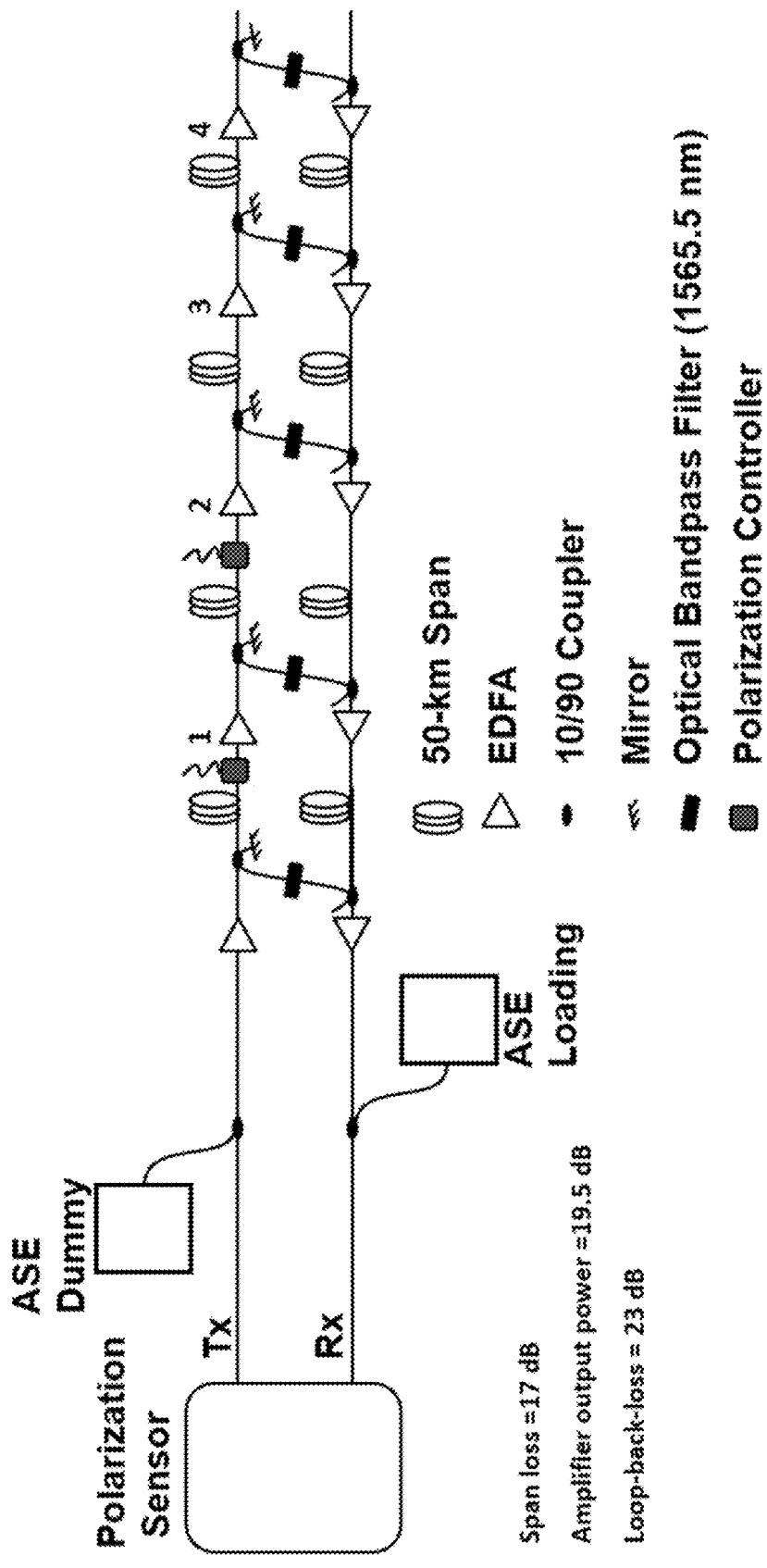
FIG. 5 is a schematic diagram showing illustrative arrangement for validating our inventive technique in which a polarization sensor creates the sensing signal, which is combined with ASE based dummy and launched into downlink (forward direction). Returning signal is combined with ASE loading to adjust its OSNR and delivered back to polarization sensor. Polarization sensor implements our technique, link has 4 spans of 50 km in down link and up link, there are loop back couplers at every amplifier between spans, according to aspects of the present disclosure.

FIG. 5 is a schematic diagram showing illustrative arrangement for validating our inventive technique in which a polarization sensor creates the sensing signal, which is combined with ASE based dummy and launched into downlink (forward direction). Returning signal is combined with ASE loading to adjust its OSNR and delivered back to polarization sensor. Polarization sensor implements our technique, link has 4 spans of 50 km in down link and up link, there are loop back couplers at every amplifier between spans, according to aspects of the present disclosure.

With reference to that figure, one can observe that the combined signal is sent down link, i.e., in the forward direction. The down link (forward) and up link (backward) both have 4 spans of 50 km length. After each span, attenuators are positioned to increase the span loss to 17 dB (not shown). Amplifiers are placed between spans, to compensate for the span loss and amplifier output power is set to 19.5 dBm. At the amplifier output, the sensing signal average power is −16 dBm. The sensing signal peak-to-average ratio is 5 dB, which corresponds to signal peak power of −11 dBm which is sufficiently low to not cause any impairment on neighboring traffic. The coupling between the uplink and the down link is achieved by using couplers, reflectors, and an optical band-pass filter.

First, the light is coupled out using a 10% coupler. A 90% port passes through the link and 10 percent is reflected back toward the coupler by a fiber coupled mirror (reflector). The back reflected light goes through the same coupler again, passes through the optical band-pass filter centered at 1565.5 nm which is the wavelength of the sensing signal. It then couples into the down-link amplifier input through the 10% port of a 10/90 coupler. Overall insertion loss of this loop-back path is about 23 dB. Note that there are two polarization controllers/scramblers placed in the link. One is positioned between span1 and the amplifier, and the second is positioned between span2 and the amplifier. These polarization scramblers can be turned on and off to emulate polarization rotation caused by external disturbances.

Since this link is much shorter than a typical undersea fiber optic cable, it does not generate sufficient ASE noise. ASE noise can limit the sensitivity of the sensing method. In order to test the method with a more realistic noise level, additional ASE is added on the sensing signal.

Figure 6:
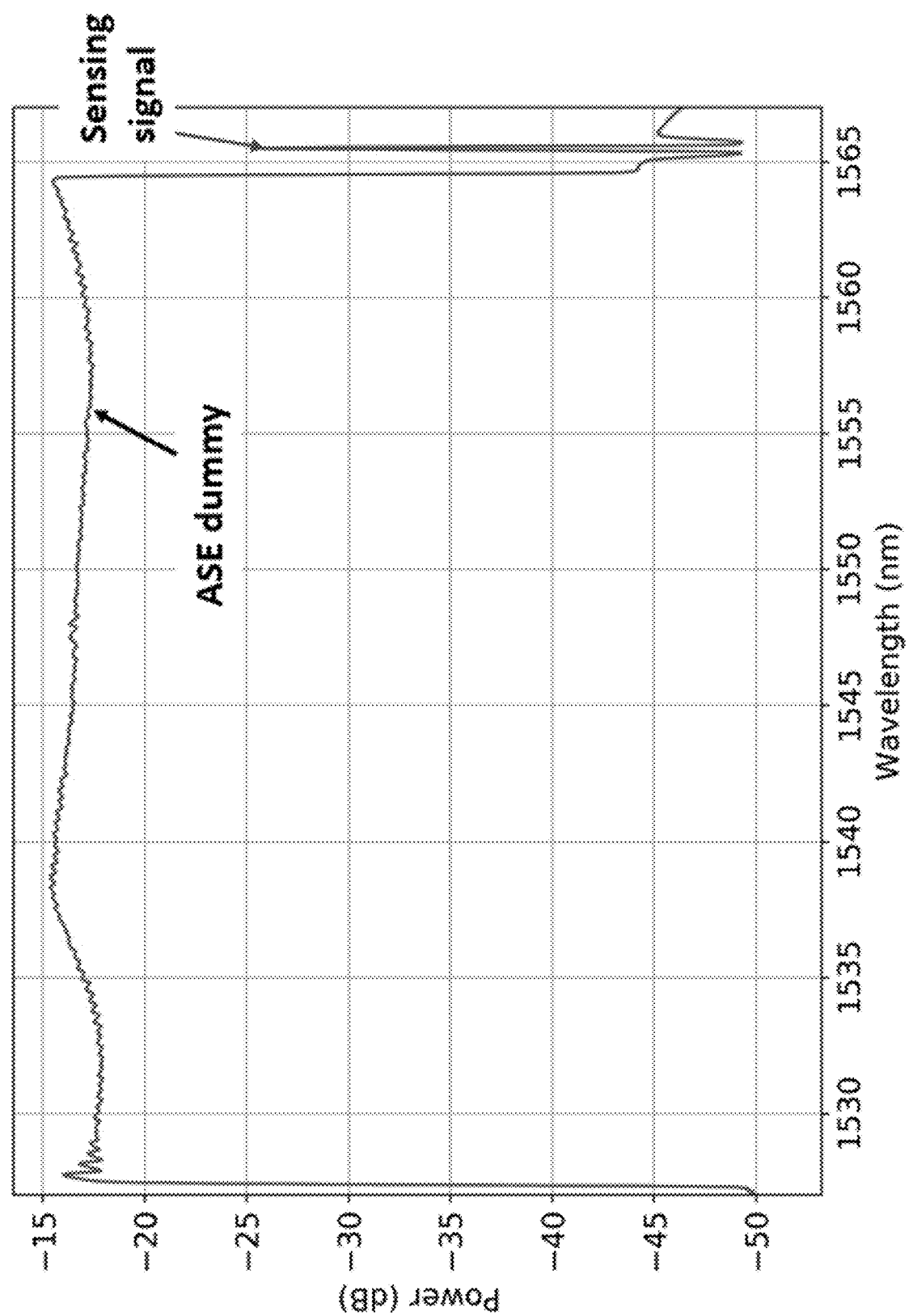
FIG. 6 is a plot of Power (dB) vs. Wavelength (nm) of illustrative spectrum of sensing signal after it is combined with ASE dummy where sensing signal is placed at the edge of the C-band at 1565.5 nm, according to aspects of the present disclosure.

FIG. 6 is a plot of Power (dB) vs. Wavelength (nm) of illustrative spectrum of sensing signal after it is combined with ASE dummy where sensing signal is placed at the edge of the C-band at 1565.5 nm, according to aspects of the present disclosure.

Figure 7:
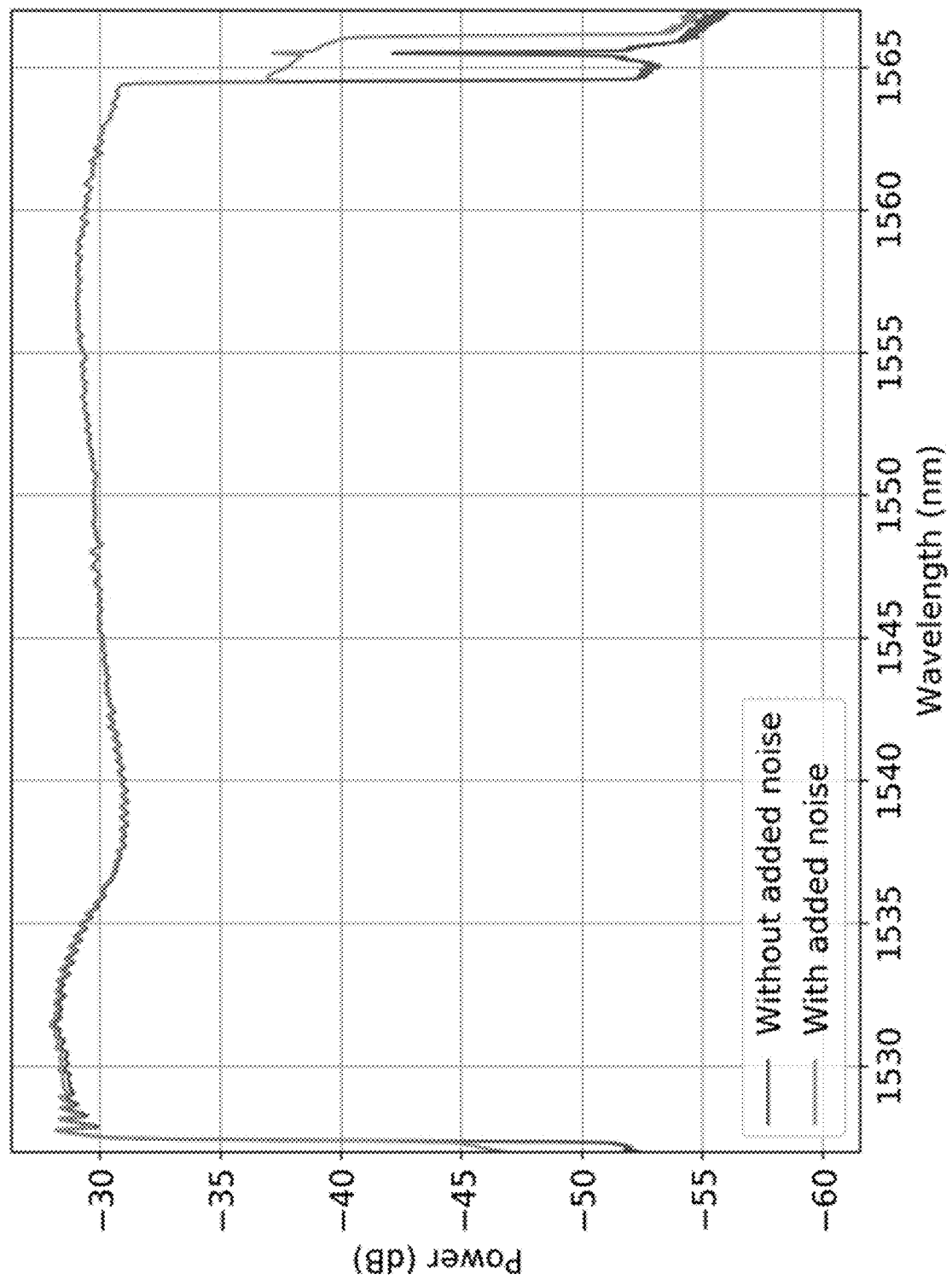
FIG. 7 is a plot of Power (dB) vs. Wavelength (nm) of illustrative spectrum received at output of downlink before ASE loading is added and after ASE loading in which spectrum is 0.06 nm resolution, and estimated OSNR of the signal is 0.1 nm noise bandwidth is −6 dB, according to aspects of the present disclosure.

FIG. 7 is a plot of Power (dB) vs. Wavelength (nm) of illustrative spectrum received at output of downlink before ASE loading is added and after ASE loading in which spectrum is 0.06 nm resolution, and estimated OSNR of the signal is 0.1 nm noise bandwidth is −6 dB, according to aspects of the present disclosure. This level of OSNR is equivalent to an ASE noise level that would be produced with a similar link as our experimental set up but with 200 spans. This is long enough for a trans-Pacific link.

Figure 8:
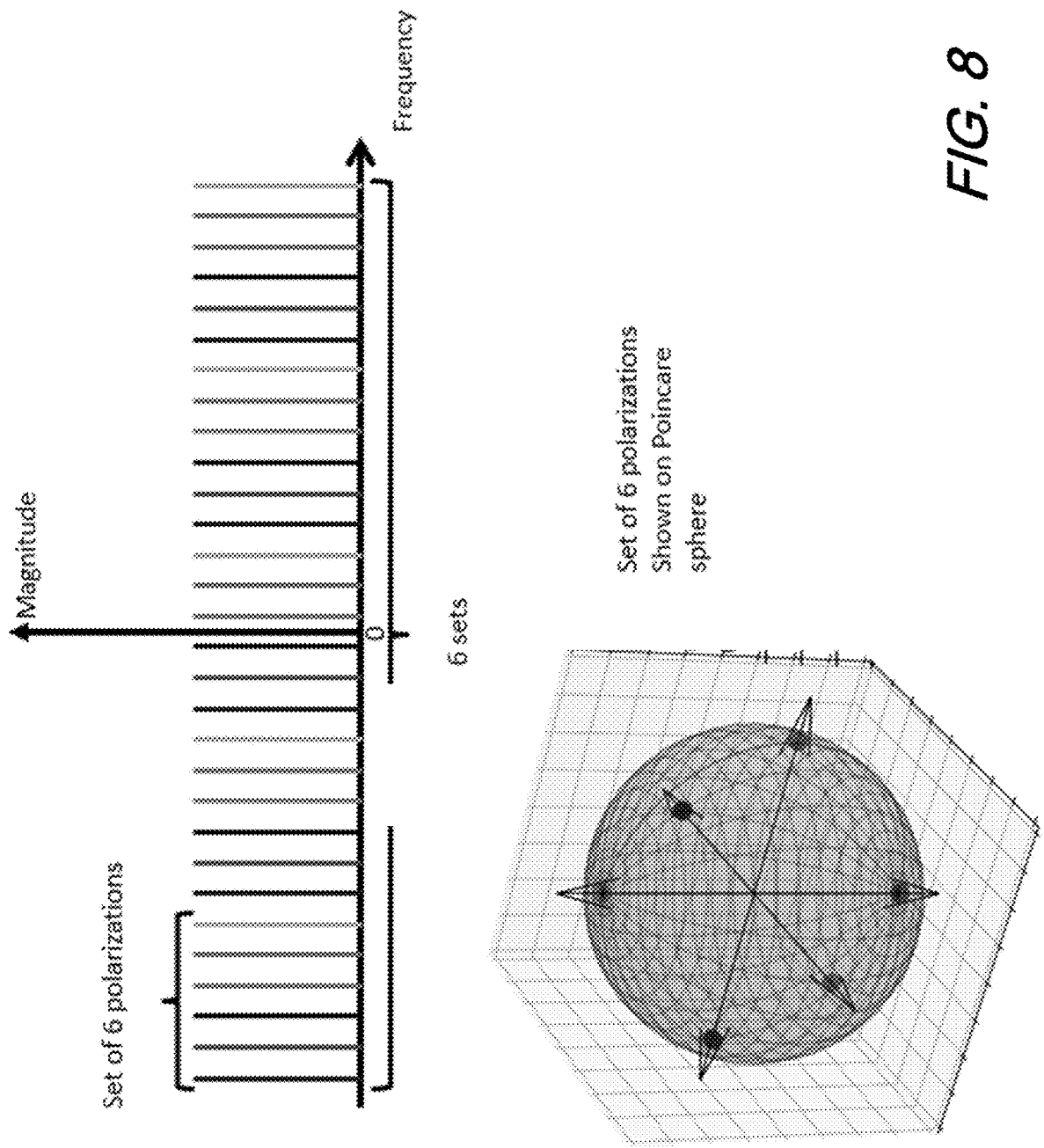
FIG. 8 is a plot of sensing signal generated by the polarization sensor shown schematically in the frequency domain, according to aspects of the present disclosure.

FIG. 8 is a plot of sensing signal generated by the polarization sensor shown schematically in the frequency domain, according to aspects of the present disclosure.

In our evaluation, we created 30 carriers, separated by 527 kHz. These 30 carriers are separated into 5 groups with each having 6 carriers. The 6 carriers in each group have 6 different SOPs located on the 6 poles of the Poincare sphere as shown in FIG. 8. The colors of the carriers match the colors of the SOPs on the Poincare sphere. The 6 carriers in the same group are modulated to create a pulse and they are aligned in time. The next group is shifted in time by 0.512 ms. With a total of 5 groups, we have a total frame length of 2.56 ms. As described above, in this experimental validation a frequency domain approach is used. We can tell which output SOP corresponds to which input SOP based on its frequency.

Figure 9:
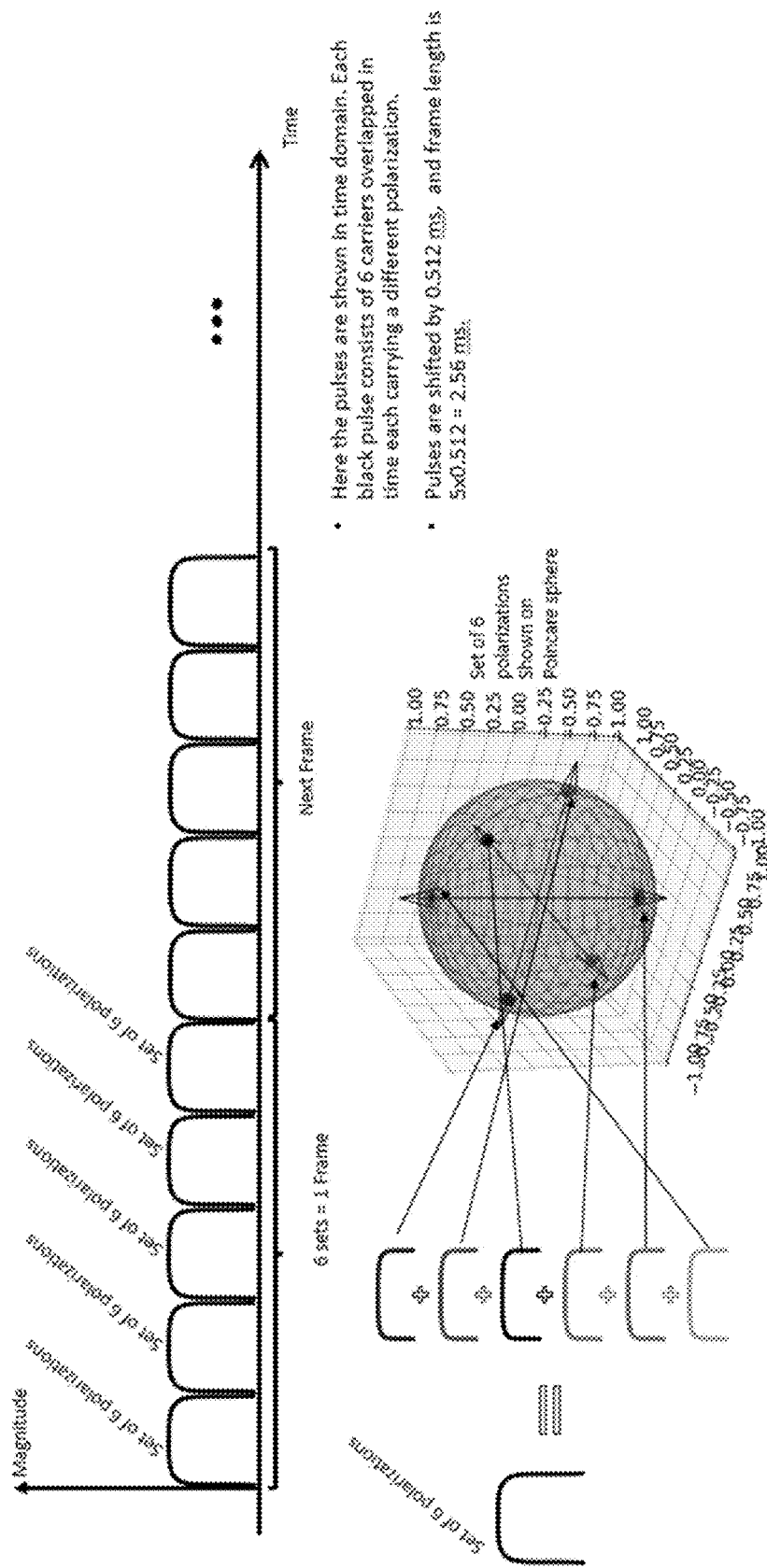
FIG. 9 is a plot of sensing signal generated by the polarization sensor shown schematically in the time domain, according to aspects of the present disclosure.

FIG. 9 is a plot of sensing signal generated by the polarization sensor shown schematically in the time domain, according to aspects of the present disclosure.

Once the sensing signal is received, each carrier is separated based on their frequency. From the frequency and the timing, we map which output SOP corresponds to which input SOP, and also, which path the signal traveled. After that, the eigenvalues are calculated according to the method described above.

To see whether we can see and also isolate the location of disturbance, we first turn on the polarization controller on the first span on. When the polarization scrambler is turned on, it randomly rotates the polarization uniformly over the Poincare sphere. This can be seen from observation traces. The signal rotating from the first reflector is still very stable as there is no polarization scrambler in that path. However, the SOPs returning from all the other paths are completely scrambled. It is not possible to determine which span or spans has disturbance just by looking at the output SOPs from these paths. Even though there is polarization rotation only on the first span, all the signal returning from the subsequent spans are also rotating just as fast. However, when we look at the eigenvalue trace, we see that only the trace for span 1 where the polarization scrambler is running is changing but all the rest are stable. This shows that our method works as intended. We can see the same conclusion from the power spectrum of the eigenvalue traces.

These experimental measurement results show that we can correctly identify which spans have polarization rotation and which ones do not using our proposed method.

Further Experiments

As we have previously noted and discussed, undersea optical fiber cable systems include a supervisory system, most of which are implemented passively and optically using High-Loss-Loop-Back (HLLBs) similar to what was shown illustratively in FIG. 5.

Operationally, the sensing signal is combined with other telecommunications traffic and sent in a downstream path. After each amplifier in the path, a portion of the sensing signal is coupled back into an upstream direction using couplers and some sort of wavelength-selective component.

For a system with N spans, there are N+1 return paths, and if a single pulse is sent there are N+1 pulses returning to the sensor traversing N+1 separate return paths which can be identified based on their time of flight. If the sensing pulse is polarized, the returning signals will return with different state of polarizations (SOPs). If there is disturbance at span k, the SOPs of all signals returning from span k will have time varying SOPs. This is how SOP is used to sense seismic activity. However, since SOPs of all the subsequent spans are also varying in time, a method to distinguish whether there is activity only around span k, or whether there are multiple activities beyond span k must be developed and such development is one aspect of the present disclosure.

Since undersea fiber optic cables exhibit negligible polarization-dependent loss, and amplifiers compensate for the span loss and the sensing signal bandwidth is sufficiently narrow the PRM of the spans can be modeled simply as unitary rotation matrices. We choose to model in Stokes space where the SOP is a normalized real vector, and the PRMs are 3×3 real unitary matrices. The PRM of the path taken by a signal returning from the $k^{th}$ span can be modeled as:

$$T_k = M_0 M_1 M_2 \ldots M_k C_k U_k \ldots U_2 U_1 U_0,$$

where $M_k$, $U_k$ and $C_k$ are the PRMs corresponding to the $k^{th}$ down-stream span, up-stream span and the HLLB connection between them, respectively. $T_k$ can be measured by sending multiple pulses each with an independent SOP. These pulses must be further distinguishable by their time of arrival, or frequency, for instance. In such a case, we would have access to all the $T_k$s however not to individual $M_k$s, $U_k$s. or $C_k$s.

Left multiplying $T_k$ by TV_1 we obtain:

$$H_k = T_{k-1}^{-1} T_k = J_k^{-1} Q_k J_k$$

where $h = U_0 U_1 U_2 \ldots U_{k-1}$ and $Q_k = C_{k-1} M_k C_k U_k$ are unitary matrices. $Q_k$ is composed of two parts, $C_{k-1}$ and $M_k C_k U_k$. The latter describes the rotation of the signal as a result of traveling over down-stream span k, loop-back path and then up-stream span k. As such, this part is what can be considered the total PRM of the $k^{th}$ span that we want to isolate. $C_{k-1}$ as a rotation matrix cannot be assumed to be small and neglected. However, $C_{k-1}$ represents the rotation due to only a few meters of fiber picking up the seismic activity compared to $U_k$ or $M_k$ which represents tens of kilometers of fiber the contribution of $C_{k-1}$ on the time dependence of $Q_k$ can be neglected. This allows us to isolate the disturbances experienced by different spans. Notice that $H_k$ is same as $Q_k$ but on a reference frame rotated by 1 k. Since J k is just a rotation matrix. $H_k$ has the same eigenvaiucs as $Q_k$. Therefore, by monitoring the changes in the eigenvalues of $H_k$ we can monitor the changes in the eigenvalues of $Q_k$. As a rotation matrix, $Q_k$ describes a rotation around a rotation axis given by its eigenvector by a polarization rotation angle (PRA) corresponding to its eigenvalue. Due to the rotated reference frame, $H_k$ may have a different rotation axis compared to $Q_k$ but it would have the same degree of rotation which is given by the eigenvalue.

As noted, FIG. 5 shows the experimental setup. The polarization sensor includes a telecom grade integrated tunable laser tuned at 1565.5 mn. The laser is split in half and one part goes through a dual-polarization IQ modulator driven by a DAC and the other half is used as the local oscillator input for the integrated coherent receiver (ICR) connected to ADC. The modulated signal is amplified and filtered using a GHz band-pass filter. A sensing signal is added at the edge of C-band which is filled with ASE dummy fight.

The transmission link includes 4 spans of 50-km lone standard single mode fiber. After the fiber spans, attenuators are added to increase the span loss to 17 dB which is compensated by EDFAs with matching gain and 19.5 dBm output power. HLLBs are emulated by using couplers after the amplifiers connecting the down-stream spans with the upstream spans. The sensing signal is reflected by a mirror and selected with filters centered around 1565.5 mm. With this configuration, the sensing signal experiences a total of 23 dB loss between the output of down-stream amplifier before the HLLB and the input of the corresponding up-stream amplifier after the HLLB.

Two polarization scramblers (PSS) are inserted into the first and second spans to emulate external stimuli that would induce random polarization rotations. To emulate the optical signal-to noise ratio (OSNR) of a typical transpacific link, additional ASE is loaded centered around the sensing wavelength that brings the OSNR to −6 dB defined at 0.1 nm noise bandwidth which is equivalent 10 ASE noise expected from a total of 200 spans. After ASE loading, the received signal is filtered and amplified before reaching the ICR.

As noted, our method relies on measuring the PRM. To measure PRM, we generate 6 pulses with 0.4 ms duration with their SOPs set at the 6 poles of the Poincare sphere, namely, linear horizontal, linear vertical, linear 45° linear −45° righthand circular, and left-hand circular. Pulses are overlapping in time and to distinguish them, their carriers are separated by 527 kHz. When these signals are received, they are separated based on their carriers. and the PRM is estimated using the Kabsch algorithm.

After preparing the first set of 6 carriers, an additional 4 more seis were prepared totaling 30 carriers spanning 15.81 MHz. Each set of 6 is prepared the same way except each set is shifted by 0.512 ms compared to the previous set to bring the total frame length to 2.56 ms which is equivalent to a monitoring range of 262 km. Though not necessary the additional sets increased the polarization sampling rate from 390 Hz to 1950 1-dz.

From results obtained we have demonstrated experimentally that we can monitor disturbances that affect signal polarization on a span-by-span basis using HLLB paths. It is shown that by measuring the polarization rotation matrix and determining the polarization rotation angle we can identify the span where the disturbance occurred with 35 dB extinction with no limitation on the magnitude of the disturbance and the number of affected spans.

Figure 10:
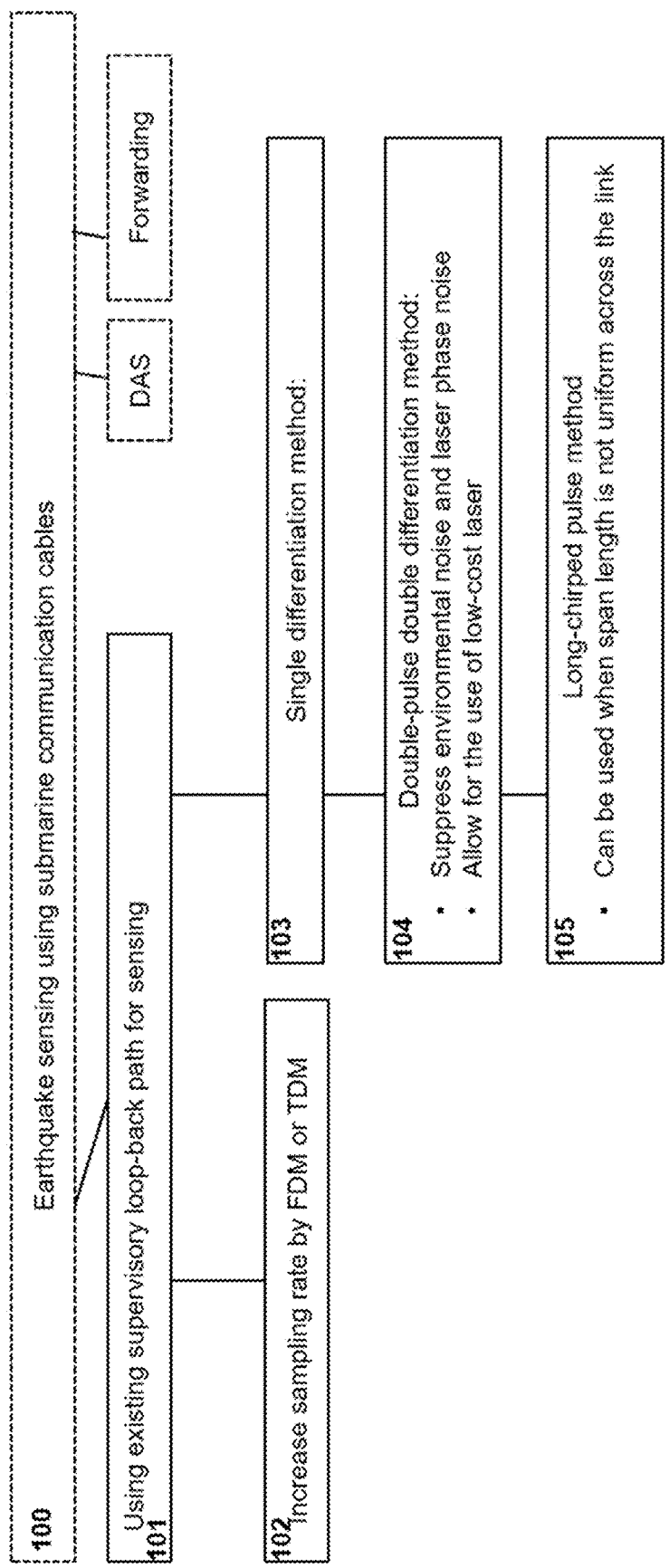
FIG. 10 is a schematic block diagram showing illustrative features of methods, according to aspects of the present disclosure.

FIG. 10 is a schematic block diagram showing illustrative features of methods, according to aspects of the present disclosure. As illustratively shown in that figure, a number of operational elements including 103 Monitor Polarization,

104 Estimate and Monitor Polarization Rotation Matrix, 105 Isolate the Span where the Disturbance is happening by Eigenvalue Method; and 106 Simplified Method for Eigenvalue Estimation, are all particularly inventive in systems and methods according to the present disclosure.

Figure 11A:
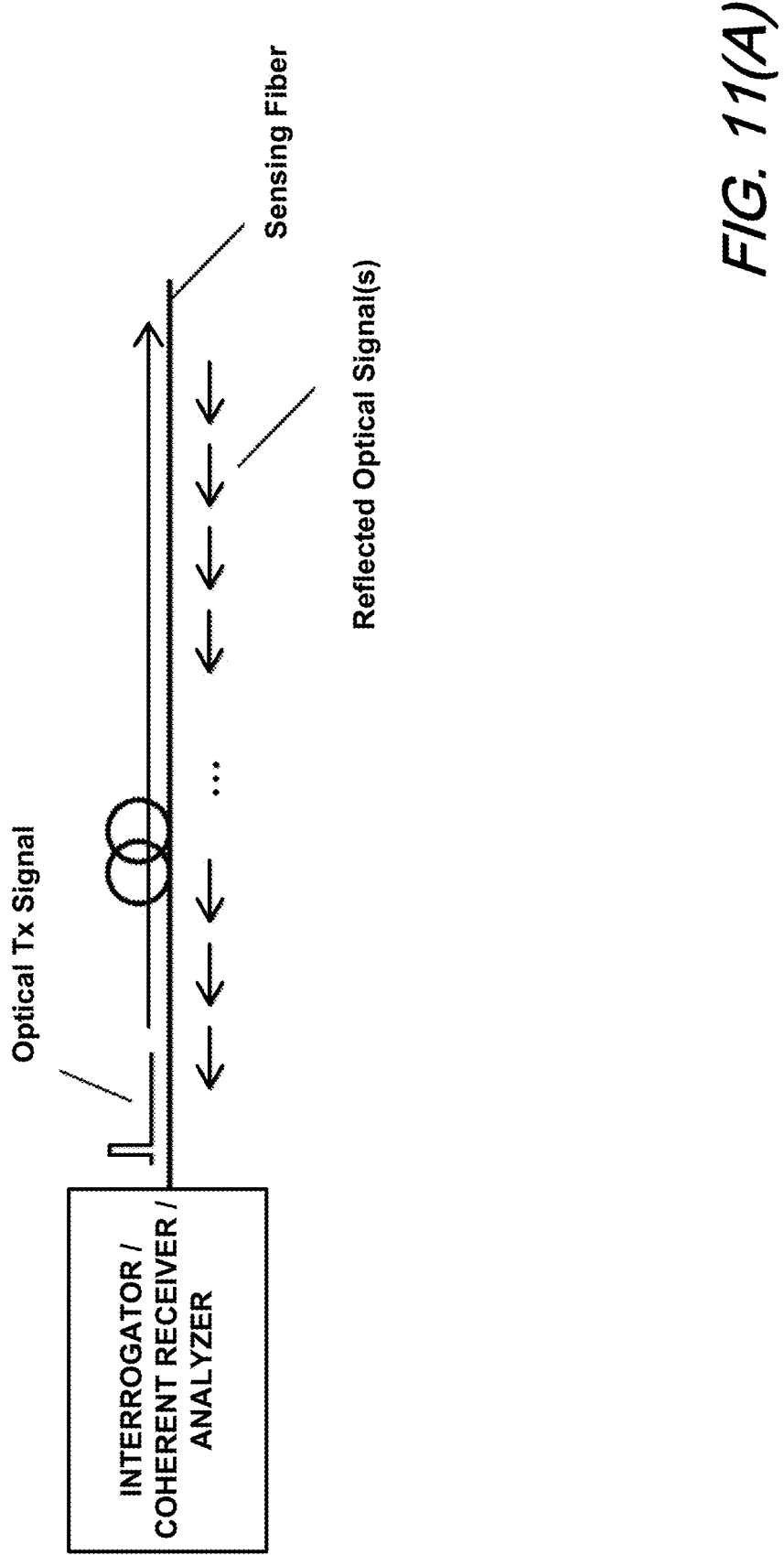
FIG. 11(A) is a schematic diagram showing illustrative Distributed Fiber Optic Sensing (DFOS) arrangement.

FIG. 11(A) is a schematic diagram showing illustrative Distributed Fiber Optic Sensing (DFOS) arrangement, according to aspects of the present disclosure.

Figure 11B:
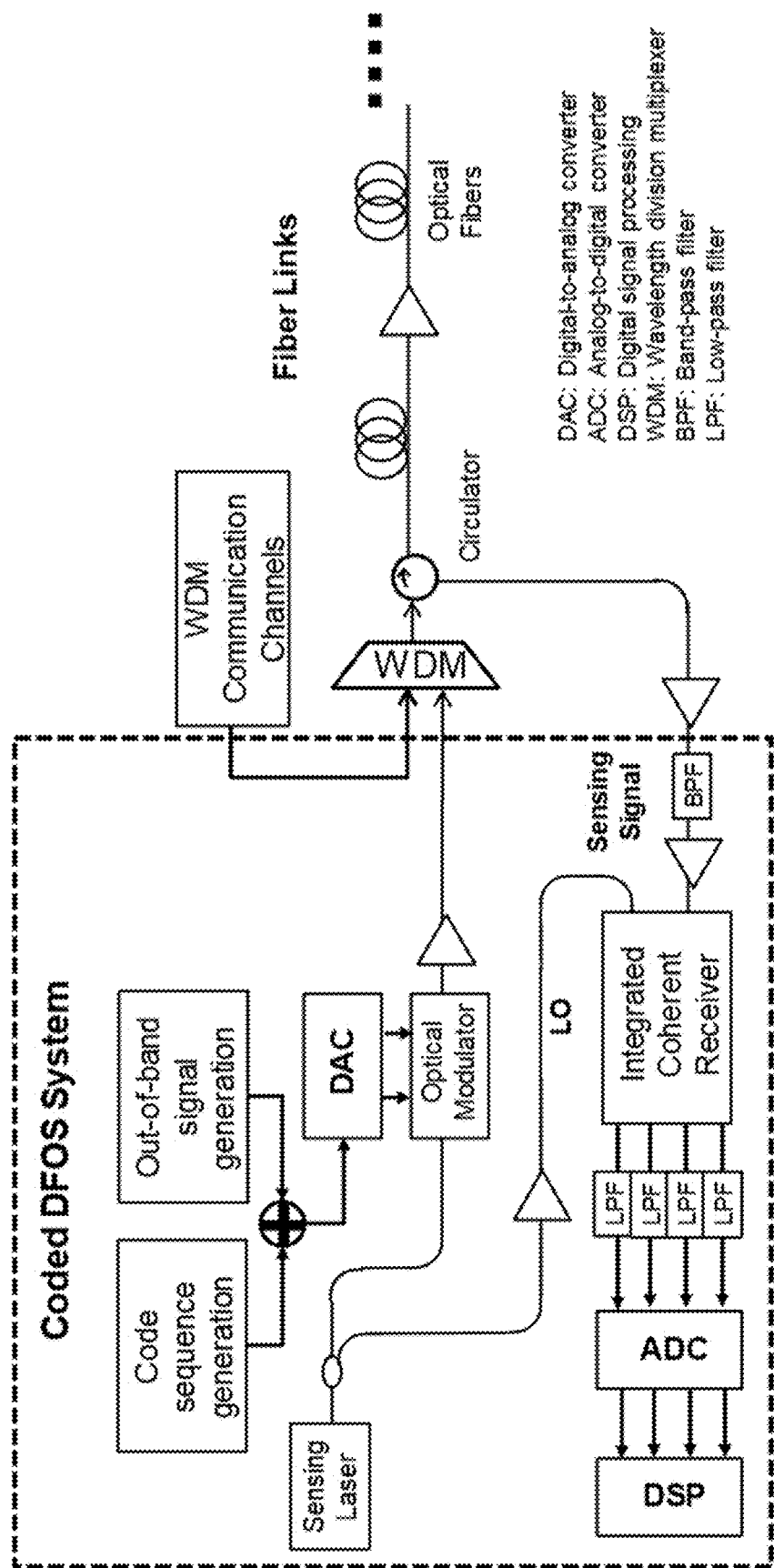
FIG. 11(B) shows an illustrative coherent DFOS receiver arrangement, both according to aspects of the present disclosure.

FIG. 11(B) is a schematic diagram illustrating a coded constant-amplitude DFOS system with out-of-band signal generation according to aspects of the present disclosure.

Finally, we conclude our disclosure with a brief review of distributed fiber optic sensing (DFOS), which is an important and widely used technology to detect environmental conditions (such as temperature, vibration, acoustic excitation vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well. FIG. 11(A) is a schematic diagram of a generalized, prior-art DFOS system. As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration. While not shown in detail, the interrogator may include a coded DFOS system that may employ a coherent receiver arrangement known in the art such as that illustrated in FIG. 11(B).

The reflected signal is converted to electrical domain and processed inside the interrogator. Based on the pulse injection time and the time signal is detected, the interrogator determines at which location along the fiber the signal is coming from, thus able to sense the activity of each location along the fiber.

At this point, while we have presented this disclosure using some specific examples, those skilled in the art will recognize that our teachings are not so limited. Accordingly, this disclosure should only be limited by the scope of the claims attached hereto.

The invention claimed is:

1. An optical fiber sensing method that monitors a polarization response function of light on a supervisory path of undersea cables, the method comprising:
   introducing, a series of optical pulses into an optical fiber of a supervisory path of the undersea cable;
   receiving, in response to the optical pulses introduced into the optical fiber if the supervisory path, a series of return pulses returned in another optical fiber of the supervisory path of the undersea cable;
   determining, a polarization transfer matrix from polarization measurements of the returned pulses;
   isolating, contributions of different spans of the undersea cable;
   determining, using the polarization measurements and the isolated different spans, whether any environmental disturbance occurred along a length of the undersea cable and a location along the length of the undersea cable where the environmental disturbance occurred; and
   outputting an indicia of the occurrence of the environmental disturbance and the location where the environmental disturbance occurred.

2. The method of claim 1 further comprising:
   setting, a predetermined state of polarization (SOP) of the optical pulses introduced into the optical fiber of the undersea cable.

3. The method of claim 2 further comprising:
   measuring, the state of polarization of the returned pulses, wherein each individual one of the returned pulses include information about the state of the polarization transfer matrix of a path the individual pulse traveled.

4. The method of claim 3 further comprising:
   isolating the span where the environmental disturbance occurred by monitoring an eigenvalue of the transfer matrix.

5. The method of claim 4 further comprising:
   estimating the eigenvalue using unitary matrices.

6. The method of claim 5 further comprising:
   estimating the polarization transfer matrix using the Kabsch algorithm and multiple input-output SOP measurements.

* * * * *